United States Patent [19]
Ehrlich

[11] Patent Number: 5,876,089
[45] Date of Patent: Mar. 2, 1999

[54] TRAILER WITH HORIZONTAL LOGISTICS SPLICE AND VERTICAL DUMMY SPLICE MEMBERS

[75] Inventor: Rodney P. Ehrlich, Monticello, Ind.

[73] Assignee: Wabash National Corporation, Lafayette, Ind.

[21] Appl. No.: 822,218

[22] Filed: Mar. 21, 1997

[51] Int. Cl.⁶ .................................................. B62D 33/00
[52] U.S. Cl. ............................................................. 296/181
[58] Field of Search ............................................. 296/181

[56] References Cited

U.S. PATENT DOCUMENTS

| | | | |
|---|---|---|---|
| 3,692,349 | 9/1972 | Ehrlich | 296/181 |
| 4,940,279 | 7/1990 | Abott et al. | |
| 4,958,472 | 9/1990 | Ehrlich . | |
| 5,041,318 | 8/1991 | Hulls | 296/181 |
| 5,112,099 | 5/1992 | Yurgevich et al. | 296/181 |
| 5,403,062 | 4/1995 | Sjostedt et al. | 296/181 |
| 5,472,290 | 12/1995 | Hulls | 296/181 |
| 5,509,714 | 4/1996 | Schmidt | 296/181 |

FOREIGN PATENT DOCUMENTS

| | | | |
|---|---|---|---|
| 2510061 | 1/1983 | France | 296/181 |

*Primary Examiner*—Gary C. Hoge
*Attorney, Agent, or Firm*—Trexler, Bushnell, Giangiorgi & Blackstone, Ltd.

[57] ABSTRACT

A novel trailer body design having a plurality of "dummy" splices thereon is provided by the present invention. The dummy splices are used to improve the aesthetics of a trailer body so that a subsequently performed repair of the body is not noticeable. The side walls of the body are formed from upper and lower panels, and a horizontal logistics member connected between the panels to join the panels together along the length of the body. The horizontal logistics member spaces the panels apart and includes a plurality of spaced apertures therethrough. The apertures align with the space so that equipment can be attached to the inside of the body. The dummy splices are vertically affixed to the outer surface of at least one of the panels and spaced apart from each other along the length thereof. Each vertical splice may be a metal or plastic plate or a decal secured to the outer surface of the panel. When a repair is performed on the trailer body due to damage of the side wall, the damaged portion of the panel, along with the adjacent dummy vertical splices, are cut out of the panel. A replacement wall section is inserted into the cutout and affixed to the remainder of the panel by conventional permanent splices. Because of the remaining dummy splices, the body does not look like it has been repaired.

22 Claims, 2 Drawing Sheets

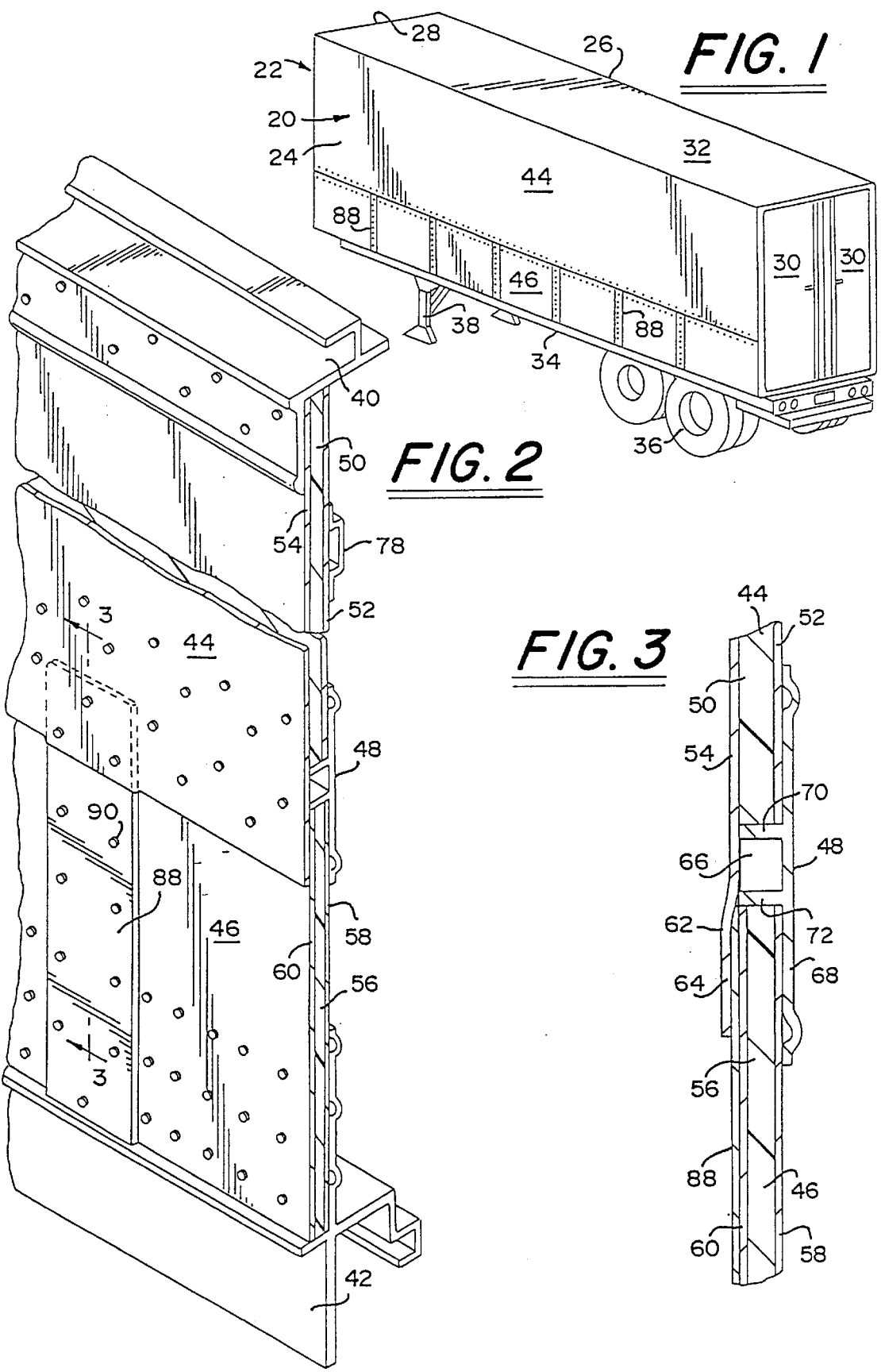

TRAILER WITH HORIZONTAL LOGISTICS SPLICE AND VERTICAL DUMMY SPLICE MEMBERS

BACKGROUND OF THE INVENTION

This invention is generally directed to a novel trailer design and a novel design for improving the aesthetics of a trailer body so that when a repair of the trailer body is subsequently performed, the repair is not noticeable. More particularly, the invention contemplates a trailer body having an upper panel and a lower panel, each of which could be a composite panel, which are joined together along the length of the trailer body by a horizontal logistics splice member and further has a plurality of vertical "dummy" splice members provided on at least one of the panels. When a repair to the trailer body is subsequently performed, the repair is not as noticeable because of the dummy splice members remaining on the trailer body.

A side wall currently used for trailer bodies includes a single panel joined to the upper and lower rails of the trailer body. Because of damage to the side wall panel, for example, caused by an accident, repairs must be undertaken. It is not preferred to replace the entire panel because of the cost involved. Instead, only the damaged portion of the panel is cut out and replaced, with the remainder of the panel remaining intact. The replacement section is spliced into the panel by using conventional, permanent splice members to rivet the replacement section to the undamaged portion of the panel. After the replacement section is spliced therein, the trailer is ready for use.

The disadvantage that results from this type of construction is that after the replacement section has been installed, it is very obvious that the trailer body has been repaired. This is aesthetically undesirable as the "patch job" is unattractive.

The present invention provides a novel solution to this disadvantage by providing vertical "dummy" splice members on the outside of the trailer body to visually break up the length of the trailer body. When a repair is needed, the damaged portion of the panel is removed along with the dummy splice members on each side of the damaged portion and a replacement section is riveted to the undamaged portion of the panel by conventional, permanent splice members to repair the damage. Thus, the repair is not noticeable because of the other dummy splice members. Other features and advantages of the present invention will become apparent upon a reading of the following description, taken in connection with the accompanying drawings.

OBJECTS AND SUMMARY OF THE INVENTION

An object of the present invention is to provide a novel trailer body side wall construction.

Another object of the present invention is to provide a novel design for improving the aesthetics of a trailer body so that when a repair of the trailer body is subsequently performed, the repair is not noticeable.

A further object of the present invention is to provide a plurality of vertical "dummy" splice members on the trailer body so that a subsequently performed repair is not noticeable.

Briefly, and in accordance with the foregoing, the present invention discloses a novel trailer body design and a novel design for improving the aesthetics of a trailer body so that when a repair of the trailer body is subsequently performed, the repair is not noticeable. The trailer body includes a floor and a pair of upstanding side walls extending upwardly from the floor. Each side wall is formed from an upper panel, a lower panel, and a horizontal logistics splice member connected to a lower end of the upper panel and to an upper end of the lower panel for joining the panels together along the length of the trailer body. The upper and lower panels could each be a sheet of material or a composite panel.

If each panel is a sheet of material, the upper panel overlaps the lower panel on the outside of the trailer so as to prevent the entrance of moisture from rain through the junction between the panels. The sheets may be made out of steel or out of aluminum, but preferably, the lower panel is made out of steel and the upper panel is made out of aluminum.

If composite panels are used, each panel is formed from a thin, inner metal skin and a thin, outer metal skin with a plastic core member secured between the inner and outer skins. The outer skin of the upper panel overlaps the outer skin of the lower panel so as to prevent the entrance of moisture from rain through the junction between the panels. The skins may be made out of steel or out of aluminum, but preferably, the lower panel skins are made out of steel and the upper panel skins are made out of aluminum.

The horizontal logistics splice member extends along the inside of the trailer body between the lower end of the upper panel and the upper end of the lower panel so as to provide a space between the upper and lower panels. The horizontal logistics splice member includes a plurality of apertures, which may be of various shapes, therethrough which are spaced apart from each other. The apertures align with the space between the panels provided by the horizontal splice member. Equipment or the like can be secured to the apertures in the horizontal logistics splice member.

A plurality of vertical "dummy" splice members are secured to the outer surface of at least one of the panels. Each vertical member generally extends the height of the panel to which it is secured and the vertical members are spaced apart from each other along the length of the panel. If the vertical members are secured to the lower panel, each vertical member has an upper end which sits between the outer skin of the upper panel and outer skin of the lower panel. Each vertical member may be metal plate member riveted to the outer surface of the panel or a plastic plate member adhered to the outer surface of the panel. Alternatively, each vertical member can be a decal adhered to the outer surface of the panel. The dummy splice members are not used to join the panel with another panel.

When a repair is to be performed on the trailer body because of damage to the trailer body side wall, the damaged portion of the panel, along with the adjacent dummy splice members on each side of the damaged portion, are cut out of the panel. A replacement wall section is inserted into the cutout and affixed to the undamaged remainder of the panel by conventional, permanent vertical splice members.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a perspective view of a trailer which incorporates the features of the invention;

FIG. 2 is a perspective view of the outside of the trailer side wall, shown partially in cross-section;

FIG. 3 is a cross-sectional view of the trailer side wall along line 3—3 in FIG. 2.

DETAILED DESCRIPTION OF THE PREFERRED EMBODIMENT

Figure 4:
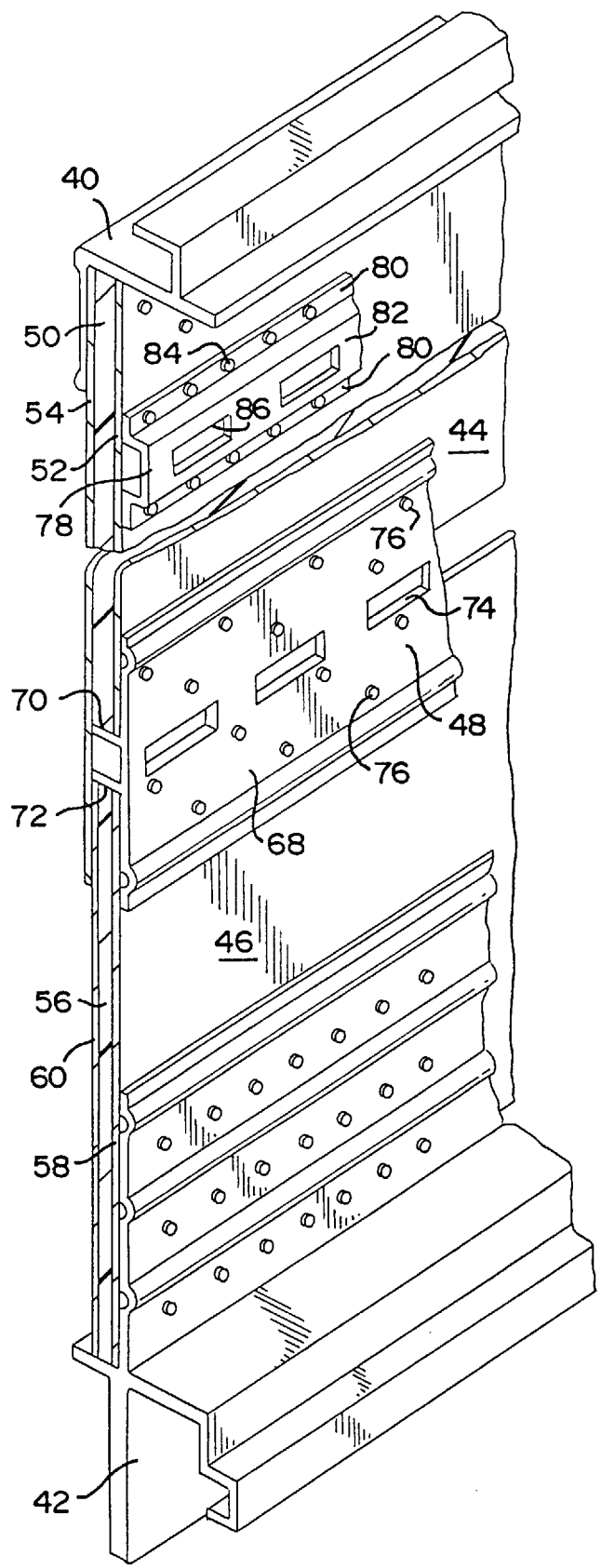
FIG. 4 is a perspective view of the inside of the trailer side wall, shown partially in cross-section.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention provides a novel side wall design for a trailer body 20 of a trailer 22. The present invention also provides a novel design for improving the aesthetics of the trailer body 20 of the trailer 22 so that when a repair of the trailer body 20 is subsequently performed, the repair is not noticeable. The trailer body 20 includes a pair of rectangular side walls 24, 26, a front wall 28, rear doors 30, a top panel or roof 32 and a floor 34. The floor 34 is supported at its rear end by a rear wheel assembly 36 and at its front end by a conventional extendable and retractable landing gear 38. The top panel 32 and upper portion of the side walls 24, 26 are secured to a top rail 40 and the floor 34 and lower portion of the side walls 24, 26 are secured to a bottom rail 42.

Each side wall 24, 26 is formed from an upper panel 44 on an upper portion thereof and a lower panel 46 on a lower portion thereof, each having a predetermined length and height, and being joined together by a horizontal logistics splice member 48 along the length of the trailer body 20. Preferably, each panel 44, 46 is a single, continuous panel, each having a predetermined length, for example, of 53 feet. That is to say, in the preferred embodiment, each panel 44, 46 is not spliced to another panel along its length to form the upper or lower portions of the side walls 24, 26. Because only two panels 44, 46 are used and are joined together at the horizontal logistics splice member 48, the trailer 22 can be made to be of any desired length and the number of junctions used to form the side walls 24, 26 is reduced.

The upper and lower panels 44, 46 can each be formed from a sheet of material. The sheets may be made out of steel or out of aluminum, but preferably, the lower panel 46 is made out of steel and the upper panel 44 is made out of aluminum. If each panel 44, 46 is a sheet of material, a portion of the upper panel 44 overlaps the lower panel 46 on the outside of the trailer 22 so as to prevent the entrance of moisture from rain through the junction between the panels 44, 46.

Alternatively, as shown in the drawings, the upper panel 44 can be a composite panel which includes a core member 50 sandwiched between an inner, thin, metal skin 52 and an outer, thin, metal skin 54 and bonded thereto by a suitable known adhesive or other like means. Similarly, as shown in the drawings, the lower panel 46 can be a composite panel which is formed with a core member 56 sandwiched between an inner, thin, metal skin 58 and an outer, thin, metal skin 60 and bonded thereto by a suitable known adhesive or other like means. The core members 50, 56 in the upper and lower panels 44, 46 are made of a non-metal plastic material, preferably thermoplastic, such as polypropylene or high density polyethylene. These materials are relatively inexpensive as compared to aluminum used in prior art trailer wall constructions. Alternatively, the upper panel 44 could be composite, while the lower panel 46 is a sheet of material, or vice versa, depending on the application.

If composite panels are provided, the skins 52, 54 which are used to form the upper panel 44 are made of metal, preferably aluminum, but steel may also be used. The inner and outer skins 52, 54 preferably have a thickness of approximately 0.025 inches and the plastic core member 50 preferably has a thickness of approximately 0.270 inches for a total panel thickness of approximately 0.320 inches. The inner skin 52 and the core member 50 have a height which is approximately equal. The outer skin 54 of the upper panel 44 has a height which is greater than the height of the inner skin 52 and of the core member 50 of the upper panel 44 so as to extend beyond the ends of the inner skin 52 and core member 50.

The skins 58, 60 which are used to form the lower panel 46 are made of metal, preferably galvanized, full hardened steel, such as AISI Grade E full hard steel because of its cost effectiveness. Preferably, the outer skin 60 is made of ASTM G90 galvanized steel and the inner skin 58 is made of ASTM G60 galvanized steel. Steel is preferred because it is very strong and damage resistant and it is the lower panel 46 that is most likely to be damaged by contact with outside objects. Aluminum may be used for the skins 58, 60 in the lower panel 46, however, aluminum is too soft for some purposes and strength and punch resistance are sacrificed, but a weight reduction is gained because aluminum is lightweight. The skins 58, 60 and the plastic core member 56 have an equal length and height. The outer skin 60 preferably has a thickness of approximately 0.019 inches, the inner skin 58 preferably has a thickness of approximately 0.025 to 0.028 inches, and the plastic core member 56 preferably has a thickness of approximately 0.253 to 0.256 inches for a total panel thickness of approximately 0.300 inches. Thus, the lower panel 46 preferably has a thickness which is slightly less than the thickness of the upper panel 44.

On the outside of the trailer body 20, the upper and lower panels 44, 46 are spliced together by a horizontal lap joint 62 which extends the entire length of the trailer 22. The horizontal lap joint 62 is formed by overlapping a portion 64 of the outer skin 54 of the upper panel 44 over an upper portion of the outer skin 60 of the lower panel 46 and securing the overlapping portion 64 to the lower panel 46 by suitable means, such as rivets. Because the outer skin 54 of the upper panel 44 is overlapped over the outer skin 60 of the lower panel 46, moisture from rain cannot readily enter into the inside of the trailer body 20 through the juncture between the upper and lower panels 44, 46. If sheets are provided for the panels 44, 46 instead of composite panels, a portion of the upper panel 44 overlaps the exterior surface of the lower panel 46.

The horizontal logistics splice member 48 is provided on the inside of the trailer body 20 between the upper and lower panels 44, 46. The horizontal logistics splice member 48 is connected between the lower end of the upper panel 44 and the upper end of the lower panel 46 and provides a space 66 between the upper and lower panels 44, 46. The horizontal logistics splice member 48 is formed by an aluminum extrusion having a flat base portion 68 and a pair of legs 70, 72 which are spaced apart from each other and perpendicularly depend from the base portion 68. A single horizontal logistics splice member 48 may be used to extend the entire length of the trailer body 20 or a plurality of horizontal logistics splice members 48 may be used and joined together by suitable means.

As shown most clearly in FIG. 3, the upper leg 70 of the horizontal logistics splice member 48 abuts against the bottom of the inner skin 52 and the bottom of the plastic core member 50 at the lower end of the upper panel 44; the lower leg 72 abuts against the upper end of the lower panel 46; and the outer ends of the legs 68, 70 abut against the inner surface of the outer skin 54 of the upper panel 44. The base portion 68 abuts against the inner surface of the upper and lower panel inner skins 52, 58. If sheets are used, the upper leg 70 of the horizontal logistics splice member 48 would abut against the bottom of the upper panel 44; the lower leg 72 would abut against the upper end of the lower panel 46; and the outer ends of the legs 68, 70 would abut against the inner surface of the portion of the upper panel 44 which overlaps the exterior surface of the lower panel 46. The base portion 68 would abut against the inner surface of the upper and lower panels 44, 46.

The base portion 68 of the horizontal logistics splice member 48 has a plurality of apertures 74, which may be of various shapes, provided therethrough which are spaced apart from each other and which align with the space 66 between the legs 70, 72. The apertures 74 are used for the connection of equipment thereto by suitable means, such as clips. The horizontal logistics splice member 48 is secured to the upper and lower panels 44, 46 by suitable means, such as rivets 76 which extend through the base portion 68 and through the respective upper and lower panels 44, 46 and the overlapping portion 64.

A horizontal logistics track 78 (shown on the upper panel 44 in the drawings) and/or a recessed round tie (not shown) may be optionally provided on either or both of the upper or lower panels 44, 46 for securement of equipment thereto. The logistics track 78 may extend the entire length of the trailer body 20 and is an aluminum extrusion having flat end portions 80 and a bulging intermediate portion 82 which extends inwardly of the flat end portions 80. The end portions 80 are secured to the inside of the inner skin of the panel by suitable means, such as rivets 84. The bulging intermediate portion 82 has a plurality of spaced apertures 86 provided therethrough for engagement of clips or the like thereto so that equipment can be secured to the logistics plate track 78.

A plurality of "dummy" vertical splice members 88 are provided on the exterior surface of the outer skin 54, 60 of one or both of the upper and lower panels 44, 46 and are spaced apart from each other so that when a subsequent repair is performed, the repair is not noticeable because of the remaining dummy splice members 88. The dummy splice members 88 are not used to splice two panels together and instead, are only secured to the exterior surface of the upper or lower panels 44, 46. As shown, the dummy splice members 88 are only provided on the exterior surface of the lower panel 46, but it is to be understood that the dummy splice members 88 could be provided on only the exterior surface of the upper panel 44 or on the exterior surfaces of both panels 44, 46. The dummy splice members 88 are preferably equidistantly spaced along the length of the trailer body side walls 24, 26, preferably 96 inches apart from each other on a standard length trailer, to visually break up the length of the trailer body 20 into each portions. Other spacing may be used depending on what is desired by the customer. When a portion of the trailer body side wall 24, 26 is damaged, the damaged portion and the dummy splice members 88 on both sides of the damaged portion are removed and replaced with a replacement section. Conventional, permanent splice members are used to seal the junction between the replacement section and the remainder of the panel 44, 46. After the repair, the trailer 22 looks like it is new and that a repair has not taken place.

Each dummy splice member 88 generally extends the entire height of the panel's exterior surface. If the dummy splice members 88 are provided on the exterior surface of the upper panel 44, the members 88 generally extend from the top rail 40 to the lower end of the panel 46. If the dummy splice members 88 are provided on the exterior surface of the lower panel 46, the members 88 generally extend from the bottom rail 42 to the upper end of the panel 46. If provided on the lower panel 46, the upper portion of each dummy splice member 88 sits between the overlapping portion 64 of the upper panel 44 and the exterior surface of the lower panel 46. It is envisioned that the dummy splice members 88 could be shorter than the length of the lower panel 46 such that the dummy splice members 88 do not sit between the overlapping portion 64 of the upper panel 44 and the lower panel 46 and instead, generally extend from the bottom rail to the bottom of the overlapping portion 64. When a repair is subsequently performed, because the permanent splice members will sit between the overlapping portion 64 of the upper panel 44 and the lower panel 46, moisture from rain cannot readily enter into the inside of the trailer body 20 through the juncture between the replacement section and the repaired panel.

The dummy splice members 88 can be elongated, generally flat metal plates and be secured to the outer surfaces of the panels 44, 46 by suitable means, such as rivets 90 or adhesive. Alternatively, the dummy splice members 88 can be elongated, generally flat plastic plates or decals and be secured to the outer surfaces of the panels 44, 46 by suitable means, such as adhesive. If a metal or plastic plate is used, each dummy splice member 88 is preferably 0.025 inches thick.

Preferably, the upper and lower portions of the side walls 24, 26 are each formed from a single, continuous panel 44, 46, respectively. It is envisioned, however, that the upper and lower portions of the side walls 24, 26 may be formed from a plurality of panel sections which are spliced with other panel sections by conventional vertical splice members on the exterior of the trailer body 20 to form the upper and lower portions of the side walls 24, 26. Each panel section is identical in construction to the upper and lower panels 44, 46 described herein. If such conventional vertical splice members are used, the dummy splice members 88 of the present invention are provided on the panel sections so as to further visually break up the upper and lower portions of the side walls 24, 26, so that when a repair is subsequently performed, the trailer body 20 will still look new.

While a preferred embodiment of the present invention is shown and described, it is envisioned that those skilled in the art may devise various modifications of the present invention without departing from the spirit and scope of the appended claims.

The invention claimed is:

1. A trailer body having a predetermined length comprising:

a floor, and a pair of upstanding side walls extending from said floor, each said side wall being comprised of an upper panel having an upper end, a lower end, a predetermined length and height and an outer surface;

a lower panel having a lower end, an upper end, a predetermined length and height and an outer surface; and a horizontal splice member connected to said lower end of said upper panel and said upper end of said lower panel for joining said upper and lower panels together along the length of the trailer body.

2. A trailer body as defined in claim 1, wherein said horizontal splice member extends between said lower end of said upper panel and said upper end of said lower panel so as to provide a space between said upper and lower panels.

3. A trailer body as defined in claim 2, wherein said horizontal splice member includes a plurality of apertures therethrough which are spaced apart from each other, said apertures aligning with said space provided by said horizontal splice member between said upper and lower panels.

4. A trailer body as defined in claim 1, further including a plurality of vertical splice members connected to the outer surface of one of said panels, each vertical splice member generally vertically extending the height of said last mentioned panel, said vertical splice members being spaced from each other along the length of the panel.

5. A trailer body as defined in claim 4, wherein each said vertical splice member is a plate member secured to the outer surface of said panel.

6. A trailer body as defined in claim 4, wherein each said vertical splice member is a decal secured to the outer surface of said panel.

7. A trailer body as defined in claim 4, wherein said upper and lower panels are each formed from an inner skin and an outer skin with a core member sandwiched between said inner and outer skins.

8. A trailer body as defined in claim 7, wherein said vertical splice members are provided on the outer surface of said outer skin of said lower panel.

9. A trailer body as defined in claim 8, wherein said outer skin of said upper panel overlaps the outer surface of said lower panel, and each said vertical splice member has an upper end which sits between said outer skin of said upper panel and said outer skin of said lower panel.

10. A trailer body as defined in claim 9, wherein each said vertical splice member is a metal plate member secured to said panel.

11. A trailer body as defined in claim 9, wherein each said vertical splice member is a decal.

12. A trailer body as defined in claim 9, wherein each said vertical splice member is a plastic plate member secured to said panel.

13. A trailer body as defined in claim 7, wherein said inner and outer skins of each panel are metal and said core member of each panel is plastic.

14. A trailer body as defined in claim 13, wherein said lower panel skins are made out of steel and said upper panel skins are made out of aluminum.

15. A trailer body having a predetermined length comprising:

a floor, and a pair of upstanding side walls extending from said floor, each said side wall being comprised of an upper panel having an upper end, a lower end, a predetermined length and height and an outer surface;

a lower panel having a lower end, an upper end, a predetermined length and height and an outer surface; and a horizontal splice member connected to said lower end of said upper panel and said upper end of said lower panel for joining said upper and lower panels together along the length of the trailer body and for providing a space between said upper and lower panels, said horizontal splice member including a plurality of apertures therethrough which are spaced apart from each other, said apertures aligning with said space provided by said horizontal splice member between said upper and lower panels.

16. A trailer body as defined in claim 15, wherein said upper and lower panels are each continuous along the length of the trailer body.

17. A trailer body as defined in claim 16, further including a plurality of vertical splice members connected to the outer surface of one of said continuous panels, each vertical splice member generally vertically extending the height of the panel, said vertical splice members being spaced from each other along the length of the panel.

18. A trailer body as defined in claim 15, wherein said upper and lower panels are formed from a plurality of sections which are joined together.

19. A trailer body as defined in claim 18, further including a plurality of vertical splice members connected to the outer surface of at least one of said sections of said panels, each vertical splice member generally vertically extending the height of said sections, said vertical splice members being spaced from each other along the length of the sections.

20. A trailer body as defined in claim 1, wherein said horizontal splice member includes a first surface and a second surface, said first surface being engaged against at least a portion of said lower end of said upper panel, said second surface being engaged against at least a portion of said upper end of said lower panel.

21. A trailer body as defined in claim 20, wherein said first surface is provided by a first leg and said second surface is provided by a second leg, each said leg extending from a base portion, said first and second legs being spaced apart from each other to provide a space between said upper and lower panels.

22. A trailer body as defined in claim 1, wherein said upper and lower panels are each formed from an inner skin and an outer skin with a core member sandwiched between said inner skin and said outer skins, and said outer skin of said upper panel overlaps the outer surface of said lower panel.

* * * * *